US009419895B2

(12) United States Patent
Liu et al.

(10) Patent No.: US 9,419,895 B2
(45) Date of Patent: Aug. 16, 2016

(54) TECHNIQUES FOR CUSTOMIZING FORWARDING DECISIONS VIA A HARDWARE LOOKUP RESULT

(71) Applicant: Brocade Communications Systems, Inc., San Jose, CA (US)

(72) Inventors: Jian Liu, Palo Alto, CA (US); Wing-Keung Adam Yeung, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 148 days.

(21) Appl. No.: 13/871,777

(22) Filed: Apr. 26, 2013

(65) Prior Publication Data

US 2014/0241357 A1    Aug. 28, 2014

Related U.S. Application Data

(60) Provisional application No. 61/769,084, filed on Feb. 25, 2013.

(51) Int. Cl.
*H04L 12/741* (2013.01)
*H04L 12/761* (2013.01)

(52) U.S. Cl.
CPC .............. *H04L 45/745* (2013.01); *H04L 45/16* (2013.01)

(58) Field of Classification Search
CPC ......... H04L 45/00; H04L 45/16; H04L 45/72; H04L 45/74; H04L 45/745
USPC ......................................... 370/390, 392, 432
See application file for complete search history.

(56) References Cited

U.S. PATENT DOCUMENTS

| 2006/0171407 | A1* | 8/2006 | Kim et al. ...................... 370/432 |
| 2007/0121486 | A1* | 5/2007 | Guichard et al. .............. 370/216 |
| 2007/0286093 | A1* | 12/2007 | Cai et al. ....................... 370/254 |
| 2013/0003732 | A1* | 1/2013 | Dholakia et al. .............. 370/390 |

\* cited by examiner

*Primary Examiner* — Feben M Haile
(74) *Attorney, Agent, or Firm* — Fountainhead Law Group P.C.

(57) ABSTRACT

Techniques for customizing forwarding decisions in a network device via a hardware lookup table result are provided. In one embodiment, a network processor of the network device can perform a lookup into a lookup table based on one or more sections of a received packet. The network processor can then determine, based on the lookup, an entry in the lookup table and retrieve, using a pointer included in the lookup table entry, a mode value from a results table. The mode value can identify an operational flow (e.g., a series of forwarding decisions) to be carried out by the network processor for forwarding the received packet.

43 Claims, 8 Drawing Sheets

| | | | DA hit (*) | | | SA miss | | SA hit | | |
|---|---|---|---|---|---|---|---|---|---|---|
| mode | PIM | key | RPF | fwd | except | shim.rpf_fail | lrn_trap | lrn_trap | shim.rpf_fail | lrn_trap | Note |
| 0 | DM | G,S | pass | 1 | 0 | 0 | <cfg_pass> | | | | 1) shim.rpf_fail=1 leads to egress Osprey learn-trap for assert condition |
| | | | fail | | 0 | 1 | <cfg_fail> | | | | 2) upon RPF pass, lrn_trap at ingress Osprey allows SW to confirm active flow (G,S requires aging, as G,S entries are data plane driven) |
| 1 | | G,* | N/A | 1 | 0 | 0 | <cfg_pass> | <cfg_miss> | pass | 0 | 1) SA search miss, learn-trap the new source at ingress Osprey |
| | | | | | | | | | fail | 1 | 2) shim.rpf_fail=1 leads to egress Osprey learn-trap for assert condition |
| 2 | | G/m,* | N/A | 0 | 0 | 0 | <cfg_pass> | | | | 1) no UEID/MGID to forward |
| | | | | | | | | | | | 2) G/m,* hit indicates new group and old source, or new group as well as new source; lrn_trap (default to 1) at ingress configurable to protect CPU |
| 0 | SM, SSM | G,S | pass | 1 | 0 | 0 | <cfg_pass> | | | | 1) shim.rpf_fail=1 leads to egress Osprey learn-trap for assert condition |
| | | | fail | | 0 | 1 | <cfg_fail> | | | | 2) upon RPF fail, lrn_trap is configurable to allow SW to detect RPF (RP tree) to SPT (shortest path tree) transition of first such packet |
| 3 | | G,* | pass | 1 | 0 | 0 | <cfg_pass> | <cfg_miss> | pass | | 1) shim.rpf_fail allows egress Osprey learn-trap for assert condition |
| | | | fail | | 0 | 1 | <cfg_fail> | | fail | | 2) SA search hit detects new source from host (local prefix) at first hop router, to install G,S HW entry |
| 4 | | G/m,* | N/A | 0 | 0 | 0 | <cfg_pass> | <cfg_miss> | pass | | 1) G/m,* covers SM default range to enable SA processing; no UEID/MGID fwd |
| | | | | | | | | | fail | | 2) G/m,* configurable lrn_trap (default to 0) allows SW to peek (no real need to have the support, keep it for flexibility) |
| | | | | | | | | | | | 3) SA search hit detects new source from host at first hop counter, to install G,S HW entry |
| 5 | BIDIR | G,* | pass | 1 | 0 | 0 | <cfg_pass> | | | | 1) RPF check failure is considered exception; shim.rpf_fail for SW info |
| | | G/m,* | fail | 0 | 1 | 1 | <cfg_fail> | | | | 2) upon RPF check pass, configurable lrn_trap allows SW to confirm active flow (BIDIR doesn't require aging, SW in most cases set it to 0) |

*FIG. 9*

TECHNIQUES FOR CUSTOMIZING FORWARDING DECISIONS VIA A HARDWARE LOOKUP RESULT

CROSS REFERENCES TO RELATED APPLICATIONS

The present application claims the benefit and priority under 35 U.S.C. 119(e) of U.S. Provisional Application No. 61/769,084, filed Feb. 25, 2013, entitled "TECHNIQUES FOR CUSTOMIZING FORWARDING DECISIONS VIA A HARDWARE LOOKUP RESULT," the entire contents of which are incorporated herein by reference for all purposes.

BACKGROUND

Most network routers today use specialized hardware, such as custom network processors, to handle the critical path tasks of processing incoming data packets and forwarding the data packets toward their destinations. Such specialized hardware is advantageous from a performance perspective since it enables a network router to perform wire-speed routing at the high data rates supported by modern physical transport standards (e.g., 10G, 40G, or 100G Ethernet). However, with current network processor designs, this performance benefit comes at the expense of hardware design complexity and extensibility.

For example, consider a conventional, hardware-based network processor that is designed to forward both unicast and multicast data traffic. Due to differences in routing protocols, the processor must typically implement, at the hardware level, distinct forwarding pipelines for unicast and multicast flows respectively. Even within the multicast context, the processor may need to implement multiple forwarding pipelines to support different Protocol Independent Multicast (PIM) standards (e.g., PIM Sparse Mode (PIM-SM), PIM Dense Mode (PIM-DM), Bidirectional PIM (PIM-BIDIR), and PIM Source-Specific Multicast (PIM-SSM)). This significantly complicates the processor's hardware design and requires pre-classification logic to determine which forwarding pipeline to use for a given data packet. This design complexity can also constrain the overall operating speed of the processor.

In addition, since the forwarding pipelines described above are generally static in nature, the pipelines are limited to supporting the specific routing functionality implemented at design-time. This means that conventional network processor designs cannot be extended to support routing protocol changes or new routing protocol standards.

SUMMARY

Techniques for customizing forwarding decisions in a network device via a hardware lookup table result are provided. In one embodiment, a network processor of the network device can perform a lookup into a lookup table based on one or more sections of a received packet. The network processor can then determine, based on the lookup, an entry in the lookup table and retrieve, using a pointer included in the lookup table entry, a mode value from a results table. The mode value can identify an operational flow (e.g., a series of forwarding decisions) to be carried out by the network processor for forwarding the received packet.

The following detailed description and accompanying drawings provide a better understanding of the nature and advantages of particular embodiments.

BRIEF DESCRIPTION OF THE DRAWINGS

FIG. 9 depicts a table of exemplary predefined mode values in accordance with an embodiment.

DETAILED DESCRIPTION

Figure 1:
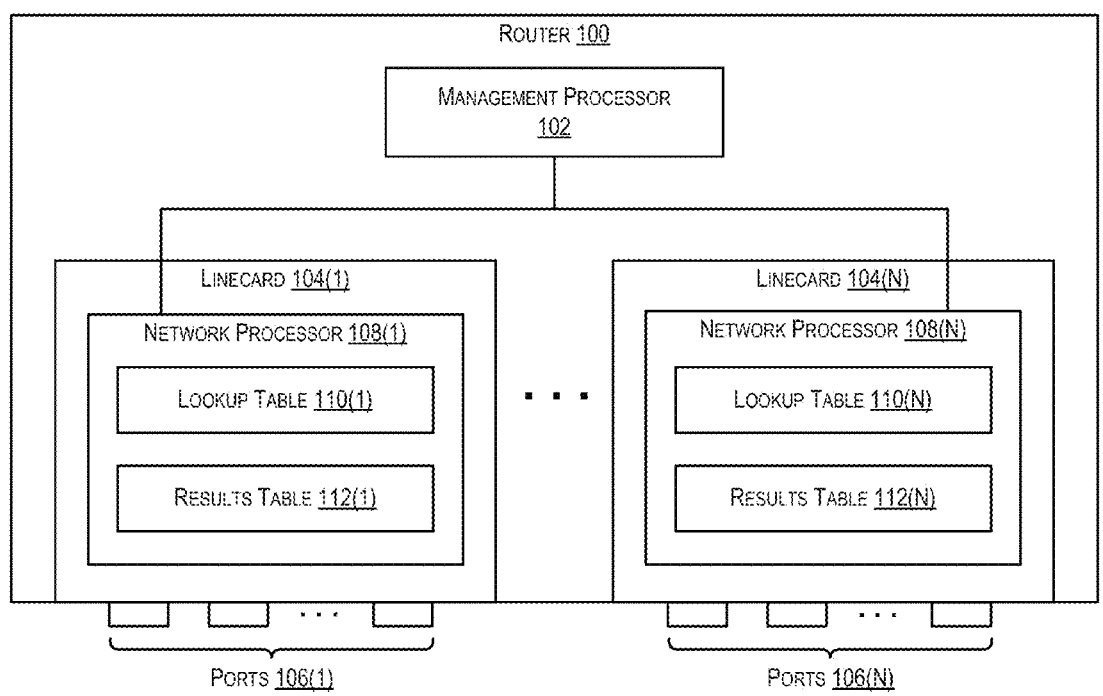
FIG. 1 depicts a simplified block diagram of a network router in accordance with an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes an improved network processor architecture that allows forwarding decisions carried out by the network processor to be controlled/customized via a hardware lookup table result. In one embodiment, the network processor can maintain a hardware lookup table that is keyed by one or more data packet sections and includes, for each lookup table entry, a pointer to an entry in a results table. The results table entries can include mode values that identify different operational flows executable by the network processor for forwarding an incoming data packet. For instance, each distinct mode value can define a series of forwarding decisions to be carried out by a forwarding pipeline of the network processor.

When the network processor receives a data packet, the processor can perform a lookup into the hardware lookup table based on the contents of the packet and can determine a corresponding entry in the results table. The network processor can then retrieve a mode value from the results table entry and forward the data packet in accordance with the operational flow identified by the mode value.

This architecture can significantly simplify the design of the network processor, since all of the forwarding decisions for a particular data packet or class of data packets can be encapsulated in a mode value stored in the results table. This means that there is no need to implement separate forwarding logic/pipelines in the processor hardware for different routing protocols; instead, the network processor can implement a single forwarding pipeline and the mode value retrieved from the results table can determine what parts of the pipeline (e.g., RPF check, CPU learn trap, etc.) will be enabled/active for a given data packet.

In addition, this architecture can make the operation of the network processor more flexible and dynamic. For example, in certain embodiments, the mode values can be programmed into the results table by a software engine that is resident on the network device or a separate controller device (e.g., a Software Defined Networking (SDN) controller). This enables the functionality of the network processor to be driven by software while maintaining the performance benefits of a hardware-based design.

In one set of embodiments, the mode values can correspond to predefined mode values that encapsulate operational flows for forwarding data packets according to existing routing protocol standards. In alternative embodiments, the mode values can correspond to custom mode values that encapsulate user-defined operational flows. In the latter case, an entry in the results table that includes a custom mode value can also include a control bitmask. The control bitmask can comprise parameter values (e.g., bits) that indicate how to handle certain forwarding decisions/actions that are preconfigured in the predefined modes.

With the custom mode values described above, certain embodiments of the present invention can flexibly accommodate new routing protocol standards that may be developed in the future. For example, if a new standard is developed that requires a new operational flow within the network processor to properly process/forward packets, a device administrator can define a custom mode value and cause the custom mode value (along with its associated control bitmask) to be programmed into the results table. The network processor can then operate in accordance with the custom mode value for the new standard. This approach obviates the need to replace/redesign the network processor hardware in response to routing protocol changes or new/emerging protocols.

2. Exemplary Network Router

FIG. 1 depicts a network router 100 according to an embodiment. As shown, network router 100 includes a management processor 102 and a plurality of linecards 104(1)-104(N). Management processor 102 is part of the control plane of network router 100 and is responsible for router management and control functions. In one embodiment, management processor 102 can correspond to a general purpose microprocessor, such as a PowerPC, Intel, AMD, or ARM microprocessor, that operates under the control of software stored in an associated memory (not shown).

Linecards 104(1)-104(N) are part of the data plane of network router 100 and each include a number of ports (106(1)-106(N) respectively) and a network, or linecard, processor (108(1)-108(N) respectively). In certain embodiments, network processors 108(1)-108(N) can correspond to customized hardware circuits, such as Application-Specific Integrated Circuits (ASICs). In other embodiments, network processors 108(1)-108(N) can correspond to programmable logic devices, such as Field-Programmable Gate Arrays (FPGAs).

In operation, each linecard 104(1)-104(N) can receive data packets via one or more ingress ports. Each data packet can include a source IP address (SA) that identifies the source of the packet and a destination IP address (DA) that identifies the destination of the packet. Upon receipt, the linecard can forward the data packet to its corresponding network processor 108(1)-108(N). The network processor can then process (e.g., parse, validate, etc.) and forward the data packet to an egress port of network router 100 in order to route the data packet to its intended destination.

As noted in the Background section, conventional hardware-based network processors typically implement multiple forwarding pipelines in order to appropriately forward different classes of data packets (e.g., unicast packets, multicast packets, etc.). Each forwarding pipeline in such a conventional processor implements a set of hardwired forwarding decisions that dictate how a data packet should be processed/forwarded in accordance with a particular routing protocol standard. One issue with this approach is that it significantly increases the design complexity of the network processor, which in turn can limit the processor's operating speed/frequency. Another issue is that the logic of each forwarding pipeline is generally fixed at design-time, which means the network processor cannot be easily modified to accommodate routing protocol changes or new protocol standards.

To address the foregoing and other similar issues, each network processor 108(1)-108(N) can include a hardware lookup table 110(1)-110(N) and a results table 112(1)-112(N). Hardware lookup table 110(1)-110(N) can be implemented using, e.g., a TCAM, and each entry of the lookup table can include a key based on one or more data packet sections and a pointer to results table 112(1)-112(N). Results table 112(1)-112(N) can be implemented using, e.g., a PRAM, and each entry of the results table can include a mode value that defines an operational flow (e.g., a series of forwarding decisions) to be carried out by network processor 108(1)-108(N).

Upon receiving an incoming data packet, network processor 108(1)-108(N) can perform a lookup into its hardware lookup table 110(1)-110(N) based on various sections of the packet (e.g., DA and SA) and thereby determine a pointer to an corresponding entry in results table 112(1)-112(N). Network processor 108(1)-108(N) can then retrieve, from the results table entry, a mode value and process/forward the data packet in accordance with the operational flow defined by the mode value. For instance, the mode value may indicate that the data packet should be validated, a copy of the data packet should be sent to management processor 202 for learning, the data packet should be forwarded via a switching fabric (not shown) to a particular egress port on another linecard, and so on.

With the foregoing approach, the behavior of network processor 108(1)-108(N) can dynamically change on a per-packet basis based on lookup table 110(1)-110(N) and results table 112(1)-112(N). This obviates the need to implement multiple, hardwired forwarding pipelines; network processor 108(1)-108(N) can implement a single forwarding pipeline and act upon (or ignore) certain portions of the pipeline in view of the mode value retrieved from results table 112(1)-112(N). The contents of lookup tables 110(1)-110(N) and results tables 112(1)-112(N) can be programmed by management processor 102 or another controller device (e.g., an SDN controller), thereby allowing the operation of network processor 108(1)-108(N) to be controlled by software state machinery.

As noted previously, in some embodiments the mode values included in results tables 112(1)-112(N) can be predefined mode values that encapsulate operational flows for existing routing protocol standards. In these embodiments, each network processor 108(1)-108(N) can include hardwired logic that identifies a predefined set of forwarding decisions for a given predefined mode value. For instance, the network processor can include hardwired logic that identifies a first predefined set of forwarding decisions for a first predefined mode value corresponding to unicast flows, a second predefined set of forwarding decisions for a second predefined mode value corresponding to PIM-SM flows, a third predefined set of forwarding decisions for a third predefined mode value corresponding to PIM-DM flows, and so on.

In other embodiments, the mode values included in results tables 112(1)-112(N) can be custom mode values that encapsulate user-defined operational flows. In these embodiments, each custom mode value can be accompanied by a control bitmask that includes parameter values (e.g., bits) indicating how to handle certain forwarding decisions/actions. These control bitmasks can be programmed into results tables 112

(1)-112(N) together with the mode values. At the time of receiving a data packet that resolves to a custom mode value, network processor 108(1)-108(N) can retrieve the control bitmask from results table 112(1)-112(N) and apply the appropriate actions in the forwarding pipeline (in accordance with the control bitmask) to process and forward the data packet.

3. Packet Processing Flow

Figure 2:
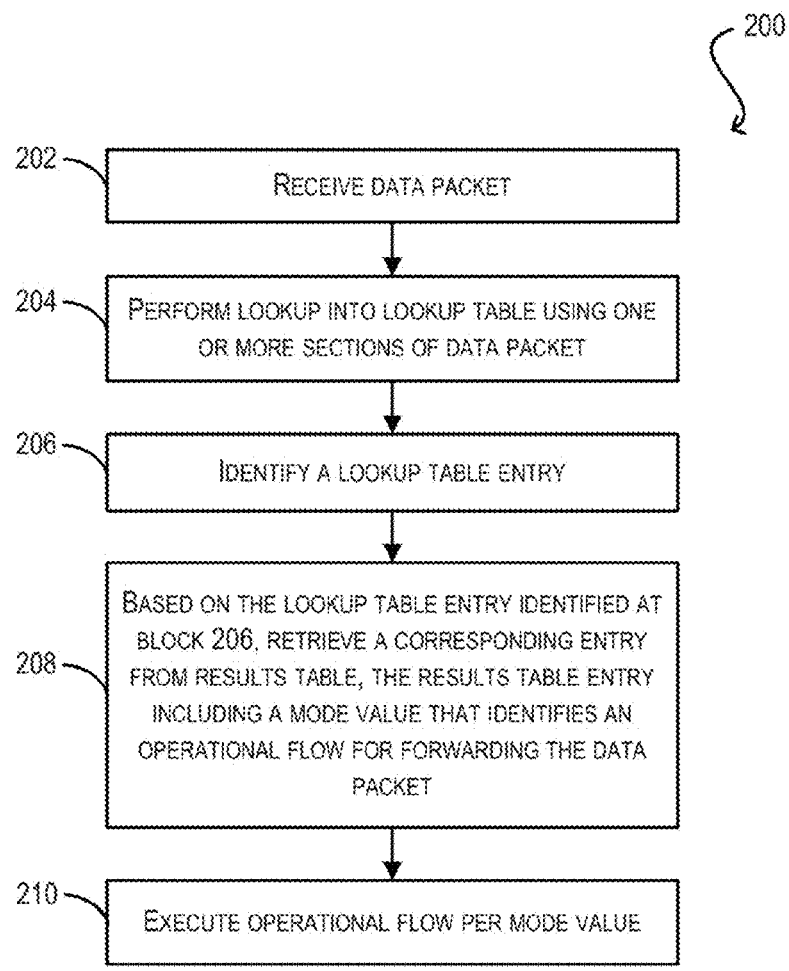
FIG. 2 depicts a flowchart for processing an incoming data packet in accordance with an embodiment.

FIG. 2 depicts a flowchart 200 that can be performed by a network processor of network router 100 (e.g., network processor 108(1)) for processing and forwarding a data packet according to an embodiment. At block 202, network processor 108(1) can receive a data packet via an ingress port 106(1) of linecard 104(1). The data packet can be, e.g., a unicast packet, a multicast packet, etc.

At block 204, network processor 108(1) can perform a lookup into hardware lookup table 110(1) using one or more sections of the received data packet. For example, network processor 108(1) can perform the lookup based on the DA and SA of the data packet. In response to the lookup, network processor 108(1) can identify a particular lookup table entry (block 206).

At block 208, network processor 108(1) can retrieve a corresponding entry from results table 112(1) based on the lookup table entry identified at block 206. The results table entry can include a mode value that identifies an operational flow for processing and forwarding the data packet. For instance, the mode value can define a series of forwarding decisions to be carried out by network processor 108(1).

Finally, at block 210, network processor 108(1) can execute the operational flow identified by the mode value and thereby process the data packet. If the mode value is a predefined mode value, network processor 108(1) can know, via hardwired logic, which forwarding decisions should apply to the data packet. On the other hand, if the mode value is a custom mode value, network processor 108(1) can extract a control bitmask from the results table entry retrieved at block 208 and determine the appropriate forwarding decisions based on the control bitmask.

4. PIM Implementation

The approach described above with respect to FIGS. 1 and 2 can be used to forward various different types of packet flows, such as unicast flows, multicast flows, and so on. In a particular implementation, this approach can be used for efficiently processing/forwarding different types of IP multicast traffic (e.g., PIM-SM, PIM-DM, PIM-BIDIR, and PIM-SSM). In this implementation, the network processor can maintain two lookup tables: a destination address, source address (DA, SA) lookup table and a source address (SA) lookup table. Each entry in the (DA, SA) lookup table can include a (Layer 3 Domain (L3D), DA, SA) key and a pointer to an entry in a results table, while each entry in the SA lookup table can include a (L3D, SA) key and a pointer to an entry in the same (or different) results table. Each entry in the results table can include a mode value.

When the network processor receives an incoming multicast packet, the network processor can perform lookups into the (DA, SA) and SA lookup tables based on the source IP address and destination IP address associated with the multicast packet. The network processor can perform these lookups without prior knowledge of the PIM variant applicable to the multicast packet. Upon completing the lookups, the network processor can retrieve, based on the (L3D, DA, SA) entry identified in the (DA, SA) lookup table, a mode value from the corresponding entry in the results table. The mode value can identify an operational flow that should be carried out by the network processor for handling the multicast packet. For example, the mode value can indicate whether the multicast packet should be processed according to the PIM-SM standard, the PIM-DM standard, etc. In one embodiment, the mode value can also indicate whether the outcome of the SA table lookup should be processed (for, e.g., PIM-SM "directly connected" check). The network processor can then process the multicast packet based on the operational flow.

With this implementation, the hardware mechanism for processing an incoming multicast packet at a network processor can be simplified to two table lookups: a first lookup into the (DA, SA) lookup table and a second lookup into the SA lookup table. These two lookups are performed universally, regardless of the PIM variant that applies to the multicast packet. The operational flow of the network processor is then adjusted as appropriate based on the mode value retrieved from the results table.

The following sections provide additional details regarding this PIM-specific implementation.

4.1. Multicast Network Environment

Figure 3:
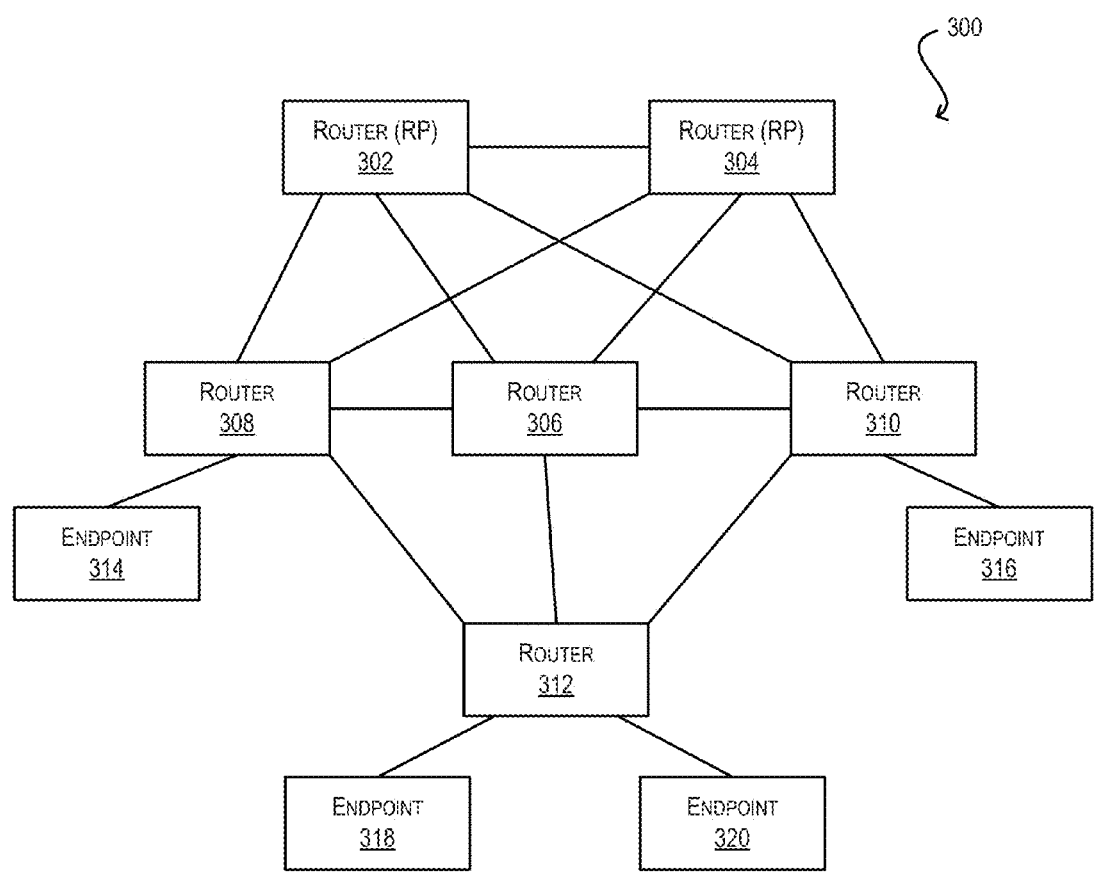
FIG. 3 depicts a simplified block diagram of a multicast network environment in accordance with an embodiment.

FIG. 3 depicts an exemplary network environment 300 that may support multicast flows according to an embodiment. As shown, network environment 300 includes routers 302-312 that form a multicast network topology. Network environment 300 also includes endpoints 314-320 that are connected to edge routers 308, 310, and 312. In one embodiment, any of endpoints 314-320 can be a source for multicast content, and any of endpoints 314-320 can be a receiver of multicast content (e.g., can join a multicast group).

For each multicast group in a network (or for a set of multicast groups defined by a range of IP multicast group addresses), one router is generally selected to be the rendezvous point, or RP, for the group. An RP is a common point at which receivers can join the group to learn of active sources. In addition, the RP acts as the root of a shared multicast distribution tree for the multicast group. In such a shared tree, multicast traffic is transmitted from sources to the RP via tunnels, and is then transmitted from the RP to the receivers down the shared tree. In the embodiment of FIG. 3, routers 302 and 304 are depicted as RPs for respective multicast groups in network environment 300.

4.2. Network Router with Multicast Support

Figure 4:
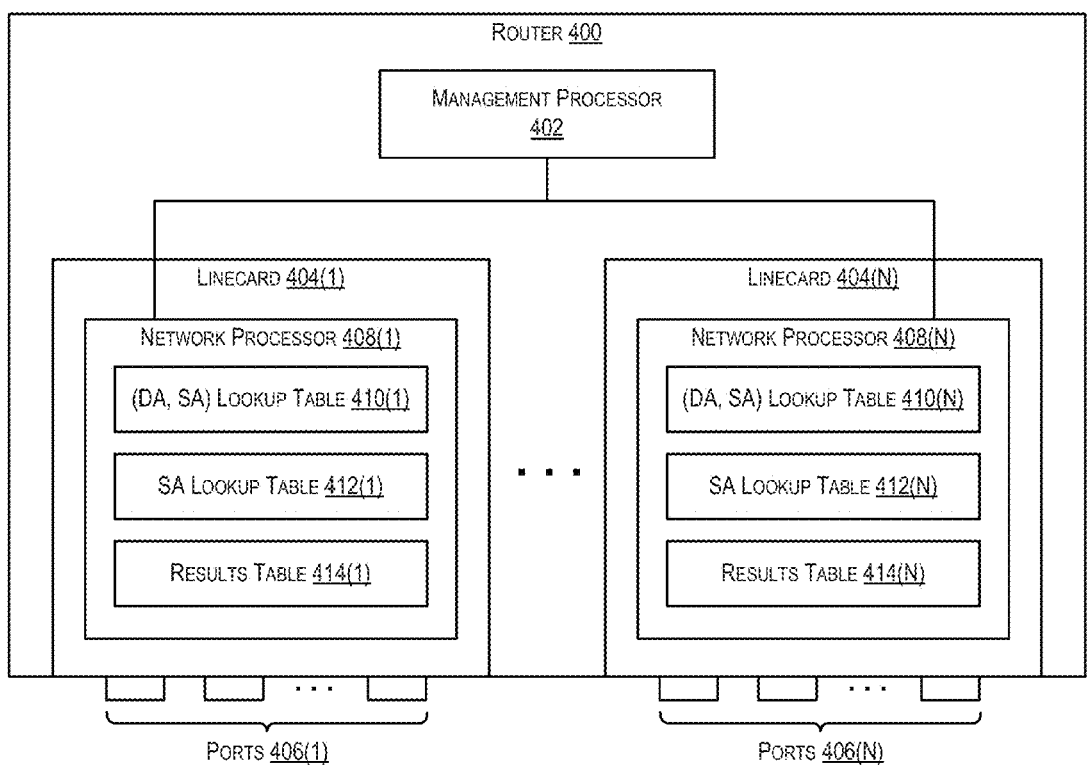
FIG. 4 depicts a simplified block diagram of another network router in accordance with an embodiment.

FIG. 4 depicts an exemplary network router 400 that supports multicast traffic routing according to an embodiment. In various embodiments, network router 400 can be used to implement any of routers 302-312 illustrated in FIG. 3.

As shown, network router 400 is substantially similar to network router 200 of FIG. 2. For example, network router 400 includes a management processor 402 and a plurality of linecards 404(1)-404(N) comprising ports 406(1)-406(N). In addition, each linecard 404(1)-404(N) includes a network processor 408(1)-408(N).

In operation, each linecard 404(1)-404(N) can receive, via one or more ingress ports, multicast packets for a multicast group. The multicast packets can include, e.g., a source IP address that identifies a source of the multicast content and a destination IP address that identifies the group's IP multicast group address. The linecard can forward the multicast packets to its corresponding network processor 408(1)-408(N), which can process the multicast packets as appropriate based on the PIM variant (e.g., PIM-SM/SSM, PIM-DM, PIM-BIDIR) applicable to the packets. For example, the network processor can determine whether to validate a multicast packet via an RPF check, whether to send a copy of the multicast packet to management processor 402 for learning, whether to forward the multicast packet via a switching fabric (not shown) to an egress port on another linecard, and so on.

Generally speaking, existing network processors that support multiple PIM variants typically need to pre-classify an incoming multicast packet as corresponding to a particular PIM variant, and then use one of several forwarding pipelines based on the pre-classification. This complicates the network processor design and limits the speed at which the network processor can operate. To address this, each network processor 408(1)-408(N) shown in FIG. 4 can employ a simplified multicast lookup architecture that includes two consolidated lookup tables—a (DA, SA) lookup table (410(1)-410(N) respectively) and an SA lookup table (412(1)-412(N) respectively)—and a results table (414(1)-414(N) respectively). Lookup tables 410(1)-410(N) and 412(1)-412(N) can be implemented using, e.g., TCAMs, while results tables 414(1)-414(N) can be implemented using, e.g., PRAMs.

Upon receiving a multicast packet, a particular network processor (e.g., 408(1)) can launch lookups into its associated (DA, SA) lookup table (e.g., 410(1)) and SA lookup table (e.g., 412(1)) based on the destination IP address and source IP address included in the multicast packet. In embodiments where lookup tables 410(1) and 412(1) are further keyed by L3D, the lookups can be further based on a port and/or VLAN ID associated with the incoming packet. Significantly, these lookups can be performed without any prior knowledge regarding the PIM variant that applies to the multicast packet. As discussed in further detail below, network processor 408(1) can then retrieve, based on the lookup into (DA, SA) lookup table 410(1), an entry from results table 414(1) that includes a mode value. The mode value can identify an operational flow to be carried out by network processor 408(1) for processing the multicast packet according to the appropriate PIM standard.

4.3. Structure of Lookup Tables and Result Table

Figure 5:
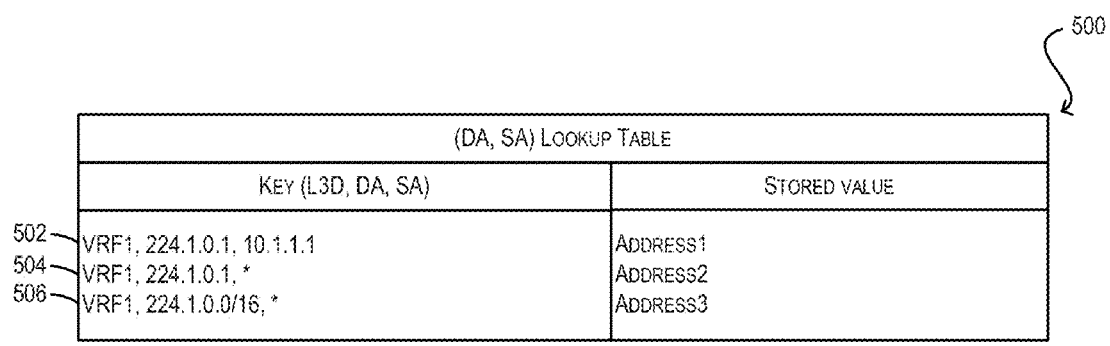
FIG. 5 depicts a first hardware lookup table in accordance with an embodiment.
Figure 6:
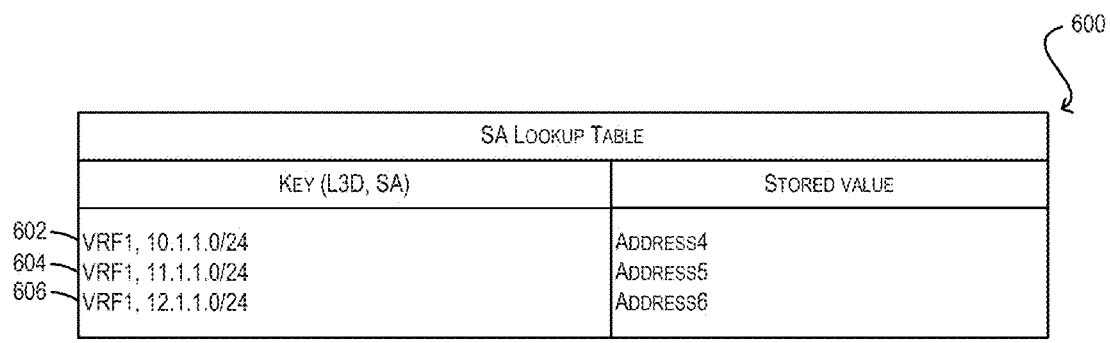
FIG. 6 depicts a second hardware lookup table in accordance with an embodiment.
Figure 7:
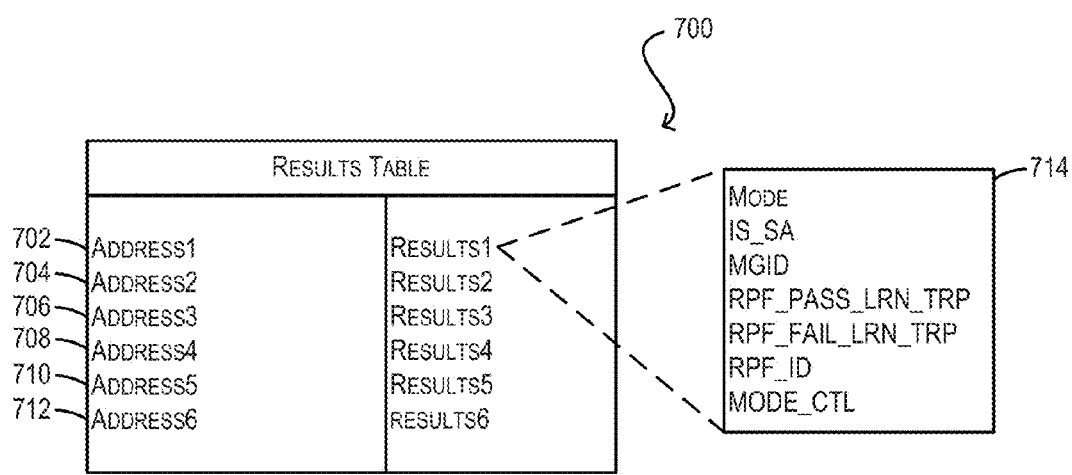
FIG. 7 depicts a results table in accordance with an embodiment.

FIGS. 5, 6, and 7 illustrate an exemplary (DA, SA) lookup table 500, an exemplary SA lookup table 600, and an exemplary results table 700 that can correspond to, e.g., (DA, SA) lookup table 410(1), SA lookup table 412(1), and results table 414(1) respectively of network processor 408(1) according to embodiments of the present invention.

Starting with reference to FIG. 5, each entry of (DA, SA) lookup table 500 includes a key based on a Layer 3 Domain (L3D), a destination address (DA), and a source address (SA). Each entry further includes a corresponding value that comprises an address pointer to results table 700.

In the embodiment of FIG. 5, (DA, SA) lookup table 500 includes three entries 502-506. Entry 502 identifies, as part of its key, a L3D "VRF1", a destination address "224.1.0.1", and a source address "10.1.1.1". This type of entry is referred to as a (G, S) entry because it identifies a specific multicast group G and a specific source S. (G, S) entries such as 502 (along with the corresponding result entries in results table 700) will typically be created in (DA, SA) lookup table 500 by, e.g., management processor 402 when it is determined that router 400 is a first hop (FH) router in a multicast flow.

Entry 504 identifies, as part of its key, a L3D "VRF1", a destination address "224.1.0.1", and a source address "*". This type of entry is referred to as a (G, *) entry because it identifies a specific multicast group G and a wildcard * for the source. This means that the (G, *) entry will match incoming multicast packets that are destined for G, regardless of the source of the packets. (G, *) entries such as 504 (along with the corresponding result entries in results table 700) will typically be created in (DA, SA) lookup table 500 by, e.g., management processor 402 when it is determined that router 400 is along a shared tree for multicast group G.

Entry 506 identifies, as part of its key, a L3D "VRF1", a destination address "224.1.0.0/16", and a source address "*". This type of entry is referred to as a (G/m, *) entry because it identifies a range of multicast groups defined by the IP multicast group address G and the subnet mask m, as well as a wildcard * for the source. This means that the (G/m, *) entry will match incoming multicast packets that are destined for a multicast group matching the non-masked portion of G, regardless of the source of the packets. (G/m, *) entries such as 506 (along with the corresponding result entries in results table 700) will typically be created in (DA, SA) lookup table 500 by, e.g., management processor 402 at the time of activating support for a particular PIM variant on router 400. For example, upon activating support for PIM-SM/SSM, management processor 402 can create a (G/m, *) entry where G/m corresponds to the address range associated with PIM-SM/SSM within network environment 300. In particular embodiment, this address range can be configured statically, or can be received from an RP (e.g., RP router 302 or 304 of FIG. 3).

Turning now to FIG. 6, SA each entry of SA lookup table 600 includes a key based on a Layer 3 Domain (L3D) and a source address (SA). Each entry further includes a corresponding value that comprises an address pointer to results table 700.

In the embodiment of FIG. 6, SA lookup table 600 includes three entries 602-606. Each of these entries identifies a L3D (e.g., "VRF1") and a masked source IP address (e.g., "10.1.1.0/24", "11.1.1.0/24", or "12.1.1.0/24"). These types of entries are referred to as S/m entries because they identify a range of source IP addresses defined by the source IP address S and the subnet mask m. This means that each S/m entry will match incoming multicast packets that originate from any endpoint whose IP address matches the non-masked portion of S. S/m entries such as 602-606 (along with the corresponding result entries in results table 700) will typically be created in SA lookup table 600 by, e.g., management processor 402 at the time of router initialization to cover all of the source IP address ranges directly connected to the linecard where table 600 is located.

Finally, with respect to FIG. 7, each entry of results table 700 includes an address (pointed to by the entries of (DA, SA) lookup table 500 and SA lookup table 600) and a results data structure. The content of this results data structure is depicted via reference numeral 714 and in one embodiment can comprise the following:

Mode—Mode value that identifies an operational flow to be performed by the network processor for processing the multicast packet matching the corresponding entry in (DA, SA) lookup table 500; can be predefined or custom (i.e., user-defined). The mappings between different types of entries in (DA, SA) lookup table 500 (e.g., (G, S), (G, *), (G/m, *)) and certain predefined mode values in results table 700 (e.g., 0-5) are described in the section "Predefined Mode Values" below.

IS_SA—Identifies whether this results entry is a result pointed to by (DA, SA) lookup table 500 or SA lookup table 600.

MGID—Identifies a forwarding entity within router 400 (e.g., fabric replication information) for forwarding the multicast packet to an egress port.

RPF_PASS_LRN_TRAP—Configurable parameter that identifies whether to apply a "learn trap" upon a successful RPF check (i.e., pass a copy of the multicast packet to management processor 402 for learning/examination). Regardless of this parameter, the multicast packet is forwarded to per the MGID. Default value is 0 (i.e., no learn trap).

RPF_FAIL_LRN_TRAP—Configurable parameter that identifies whether to apply a learn trap upon RPF check fail. Default is 0 (i.e., no learn trap).

ID—Identifier of RPF interface/port.

MODE_CTL—Bit mask for specifying control bits of mode value (applicable only to custom mode values described in the section "Custom Mode Values" below).

4.4. Multicast Packet Processing Flow

Figure 8:
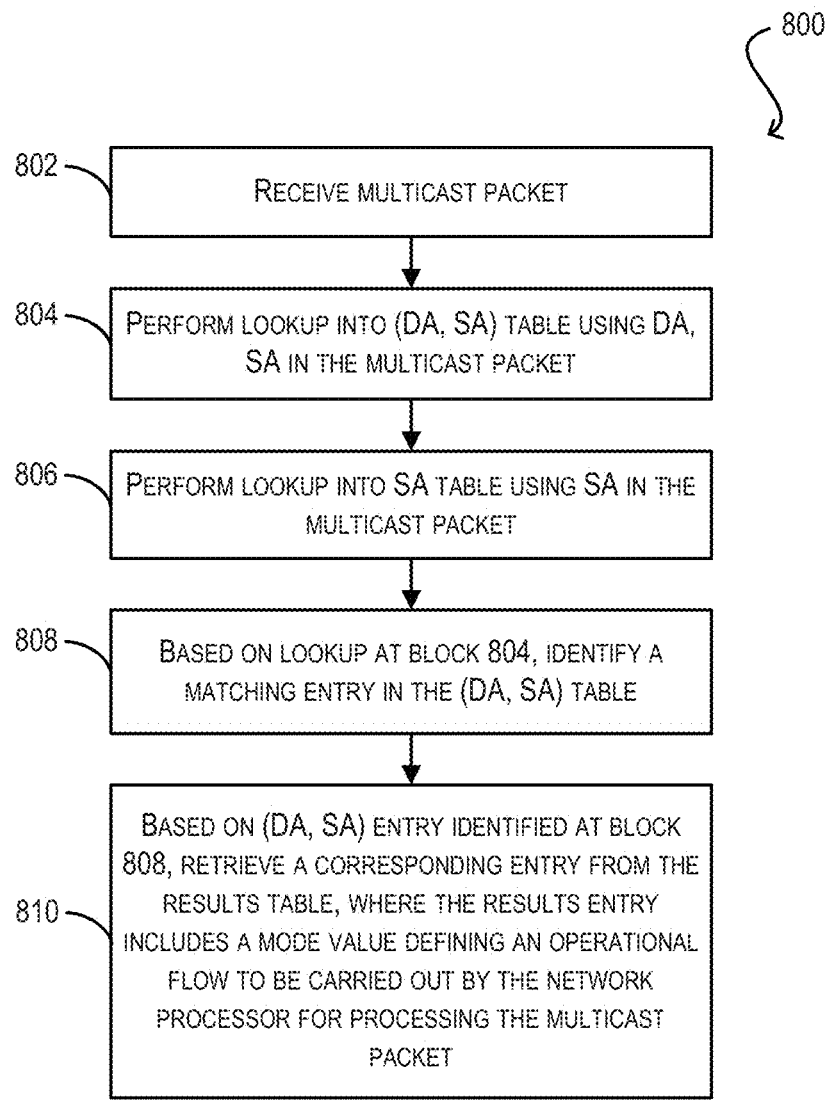
FIG. 8 depicts a flowchart for processing an incoming multicast packet in accordance with an embodiment.

FIG. 8 depicts a flowchart 800 that can be performed by, e.g., network processor 408(1) of router 400 for processing an incoming multicast packet using (DA, SA) lookup table 410 (1), SA lookup table 412(1), and results table 414(1) according to an embodiment.

At block 802, network processor 408(1) can receive a multicast packet via an ingress port of linecard 404(1). The multicast packet can include, e.g., a source IP address (SA) identifying a source of the multicast packet, a destination IP address (DA) identifying a target multicast group for the multicast packet, and a port and/or VLAN ID.

At block 804, network processor 408(1) can perform a lookup into (DA, SA) lookup table 410(1) using the DA and SA (and optionally the port/VLAN ID) associated with the multicast packet. In one embodiment, the lookup can be performed using "longest prefix match," or LPM, such that the entry with the most specific (L3D, G, S) key in lookup table 210(1) is selected. For instance, assume that the DA for the multicast packet is 224.1.0.1 and the SA for the multicast packet is 10.1.1.1. In this case, the lookup would match entries 502 and 506 in table 500 of FIG. 5, but the lookup would return entry 502 since this is the most specific match.

At block 806, network processor 408(1) can also perform a lookup into SA lookup table 412(1) using the SA (and optionally the port/VLAN ID) associated with the multicast packet. Like the lookup performed at block 804, this second lookup can be performed using LPM. In a particular embodiment, network processor 408(1) can perform the lookups of blocks 804 and 806 in parallel.

Once the lookups into tables 410(1) and 412(1) are performed, network processor 408(1) can identify the best match entry in (DA, SA) lookup table 410(1) (block 808). Network processor 408(1) can then retrieve, based on the identified best match (DA, SA) entry, a corresponding entry from results table 414(1) (block 810). The results entry retrieved at block 810 can include a mode value and other configurable parameters (as shown in data structure 714 of FIG. 7) that define an operational flow to be carried out by network processor 408(1) for processing the multicast packet.

For example, the mode value can indicate whether the multicast packet should be validated via a Reverse Path Forwarding (RPF) check, whether the multicast packet should be forwarded to an egress port, whether a copy of the multicast packet should be sent to the control plane (e.g., management processor) of the network device for learning/evaluation, and so on. In a particular embodiment, the mode value can also indicate whether the outcome of the lookup into SA lookup table 412(1) should be processed (for, e.g., PIM-SM first hop data registration). Network processor 408(1) can subsequently process the multicast packet in accordance with this operational flow.

Note that in flowchart 800, there is no need for network processor 408(1) to pre-classify an incoming multicast packet as pertaining to a particular PIM variant (e.g., PIM-SM/SSM, PIM-DM, or PIM-BIDIR) and then carry out branching lookup logic based on the pre-classification. Instead, network processor 408(1) always performs the same two table lookups (i.e., blocks 804 and 806) when it receives a multicast packet, regardless of the PIM variant/type applicable to the packet.

Network processor 408(1) then uses the results of the first lookup (e.g., the mode value) to determine how to process/forward the multicast packet. As a result, this approach is significantly less complex, and thus provides better performance, than prior art hardware approaches to multicast lookup.

4.5. Predefined Mode Values

An important aspect of the approach described with respect to FIG. 8 involves defining the operational flows associated with the mode values stored in results table 414(1), as well as the relationships between those mode values and the entries of lookup tables 410(1) and 412(1). In one embodiment, each mode value can correspond to one of a number of predefined mode values. These predefined mode values can be hardwired or preprogrammed into network router 400 and can identify operational flows for processing multicast packets according to the existing PIM-SM/SSM, PIM-DM, and PIM-BIDIR standards. FIG. 9 depicts a table 900 that illustrates six such predefined mode values (0-5), along with the operational flow/logic for each mode value and the mapping(s) between the mode value and the (G, S), (G, *), and/or (G/m, *) entries in (DA, SA) lookup table 410(1):

As shown in table 900, (G, S), (G, *), and (G/m, *) entries that fall within a PIM-DIM multicast address range map to predefined mode values 0, 1, and 2 respectively. (G, S), (G, *), and (G/m, *) entries that fall within a PIM-SM or PIM-SSM address range map to predefined mode values 0, 3, and 4 respectively. And (G, *) and (G/m, *) entries that fall within a PIM-BIDIR multicast address range map to predefined mode value 5. The following subsections provide additional details regarding the operational flow defined for each predefined mode value 0-5.

4.5.1. Mode 0

Mode 0 applies to (G, S) entries for PIM-DM and PIM-SM. Per table 900, mode 0 indicates that an incoming multicast packet should be:

1. Validated via an RPF check (see "pass/fail" in "RPF" column)
2. Forwarded to an egress port regardless of whether the RPF check passes or fails (see value 1 in "fwd" column)
3. In the case of an RPF check failure, marked with an indication of the RPF check failure in the header (i.e., shim) of the packet (see value 1 in the "shim.rpf_fail" column)

In mode 0, learn trap processing can be configurable in the case of either RPF check pass or RPF check failure after a (DA, SA) hit (see "lrn_trap" column under "DA hit"). This behavior can be set via the RFP_FAIL_LRN_TRAP and RPF_PASS_LRN_TRAP parameters in results data structure 714. Further, mode 0 does not perform any processing of the lookup results for SA lookup table 412(1) (see empty cells under "SA miss" and "SA hit").

4.5.2. Mode 1

Mode 1 applies to (G, *) entries for PIM-DM. Per table 900, mode 1 indicates that an incoming multicast packet should be forwarded to an egress port without RPF check validation (see "N/A" in "RPF" column and value 1 in "fwd" column) In addition, mode 1 indicates that the outcome of the lookup into SA lookup table 412(1) should be evaluated. In particular, a RPF check should be performed upon finding a matching entry in SA lookup table 412(1) (i.e., an "SA hit"). If the RPF check fails, this failure should be marked in the packet shim.

Like mode 0, learn trap processing in mode 1 can be configurable in the case of either RPF check pass or RPF check failure via the RFPFAIL_LRN_TRAP and RPF_PASS_L-RN_TRAP parameters in results data structure 714.

4.5.3. Mode 2

Mode 2 applies to (G/m, *) entries for PIM-DM. Per table 900, mode 2 indicates that an incoming multicast packet should not be forwarded to an egress port (note that there is no MGID in this scenario for forwarding purposes). Learn trap processing can be configurable via the RPF_PASS_LRN_TRAP parameter in results data structure 714.

4.5.4. Mode 3

Mode 3 applies to (G, *) entries for PIM-SM/SSM. Per table 900, mode 3 indicates that an incoming multicast packet should be:
1. Validated via an RPF check
2. Forwarded to an egress port regardless of whether the RPF check passes or fails
3. In the case of an RPF check failure, marked with an indication of the RPF check failure in the packet shim Like mode 0, learn trap processing in mode 3 can be configurable in the case of either RPF check pass or RPF check failure after a (DA, SA) hit. In addition, mode 3 indicates that the outcome of the lookup into SA lookup table 412(1) should be evaluated. In particular, a RPF check should be performed upon an SA hit. If the RPF check passes, the packet should be passed to management processor 402 to learn the source (and install a new (G, S) entry in (DA, SA) lookup table 410(1)).

4.5.5. Mode 4

Mode 4 applies to (G/m, *) entries for PIM-SM/SSM. Per table 900, mode 4 indicates that an incoming multicast packet should not be forwarded to an egress port (note that there is no MGID in this scenario for forwarding purposes). Learn trap processing can be configurable via the RPF_PASS_LRN_TRAP parameter in results data structure 714.

In addition, mode 4 indicates that the outcome of the lookup into SA lookup table 412(1) should be evaluated. In particular, a RPF check should be performed upon an SA hit.

If the RPF check passes, the packet should be passed to management processor 402 to learn the source (and install a new (G, S) entry in (DA, SA) lookup table 410(1)).

4.5.6. Mode 5

Mode 5 applies to (G, *) and (G/m, *) entries for PIM-BIDIR. Per table 900, mode 5 indicates that an incoming multicast packet should be:
1. Validated via an RPF check
2. Forwarded to an egress port if the RPF check passes
3. Dropped if the RPF check fails
4. In the case of an RPF check failure, marked with an indication of the RPF check failure in the packet shim Like other modes, learn trap processing in mode 5 can be configurable in the case of either RPF check pass or RPF check failure after a (DA, SA) hit via the RFP_FAIL_LRN_TRAP and RPF_PASS_LRN_TRAP parameters in results data structure 714. Mode 5 does not perform any processing of the lookup results for SA lookup table 412(1).

4.6. Custom Mode Values

In addition to (or in lieu of) the predefined mode values 0-5 described above, in certain embodiments one or more of the mode values stored in results table 414(1) can correspond to a custom mode value (e.g., 6, 7, etc.) that is defined by an administrator of network router 400. Such custom mode values can be used to change the operational behavior of network processor 408(1) for existing PIM variants, or to support potentially new multicast routing protocols.

To implement a custom mode value, management processor 402 can be programmed to map the custom mode value to one or more entry types (e.g., (G, S), (G, *), (G/m, *) in (DA, SA) lookup table 410(1). This enables management processor 402 to populate results table 414(1) appropriately when (DA, SA) entries in lookup table 410(1) are created.

Further, management processor 402 can be programmed to include a user-defined control bitmask in each custom mode results entry. For example, this control bitmask can be included in the MODE_CTL field of results data structure 714. The control bitmask can comprise a set of parameter values (e.g., bit values) that define the operational flow associated with the custom mode value. Network processor 408(1) can then retrieve this control bitmask at the time of retrieving the custom mode value from results table 414(1) to determine how it should process the current multicast packet.

In a particular embodiment, the control bitmask can include user-defined bit values for the following parameters:
DA_RPF—Indicates whether RPF check should be performed upon (DA, SA) hit
DA_RPF_CK_SET—Indicates whether RPF ID corresponds to an L3 interface ID or an L3 interface set (the latter is used for PIM-BIDIR)
DA_FWD—Indicates whether the network processor should pick up MGID from the (DA, SA) result
DA_RPF_FAIL_EXCPT—Indicates that if the (DA, SA) RPF check fails, the network processor should generate an exception and force the packet to drop by setting it to a drop MGID. It also indicates that the network processor should disregard the SA lookup
SA_SRCH—Indicates that the network processor should disregard the SA lookup
SA_MISS_SET_LRN_TRAP—Sets learn trap if SA lookup is a miss; this is intended for PIM-DM (when (DA, SA) lookup hits a (G, *) entry but the SA lookup is a miss, PIM-DM needs to learn of a new source for an existing group entry
SA_RPF_FAIL_SET_SHIM—If RPF check against SA result fails, marks packet shim with rpf fail bit to true and continues to forward based on the MGID. This can be used for the SA entry in PIM-DM The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
performing, by a network processor of a network device, a lookup into a first lookup table based on one or more sections of a received multicast data packet, the received multicast data packet implementing one of a plurality of Protocol Independent Multicast (PIM) types that include PIM Sparse Mode (PIM-SM), PIM Dense Mode (PIM-DM), Bidirectional PIM (PIM-BIDIR), and PIM Source-Specific Multicast (PIM-SSM);

determining, by the network processor based on the lookup into the first lookup table, a first lookup table entry matching the one or more sections of the received multicast data packet;

retrieving, by the network processor based on a pointer included in the first lookup table entry, a mode value from a results table, wherein the mode value identifies an operational flow to be carried out by the network processor for forwarding the received multicast data packet, and wherein the mode value differs based upon the PIM type implemented by the received multicast data packet and a (destination address (DA), source address (SA)) key of the first lookup table, the DA corresponding to one or more multicast group addresses associated with the PIM type; and forwarding, by the network processor, the received multicast packet in accordance with the operational flow identified by the mode value.

2. The method of claim 1 further comprising:
performing a lookup into a second lookup table based on the SA of the received multicast data packet.

3. The method of claim 2 wherein the lookup into the first lookup table and the lookup into the second lookup table are performed by the network processor in parallel.

4. The method of claim 2 wherein the lookup into the second lookup table is based on a L3D of the received multicast data packet.

5. The method of claim 2 wherein the mode value indicates whether the network processor should evaluate or ignore the outcome of the lookup into the second lookup table.

6. The method of claim 1 wherein the lookup into the first lookup table is further based on a Layer 3 Domain (L3D) of the received multicast data packet.

7. The method of claim 1 wherein the network processor does not classify the received multicast data packet as implementing a particular PIM type prior to performing the lookup into the first lookup table.

8. The method of claim 1 wherein the mode value corresponds to one of six predefined mode values.

9. The method of claim 1 wherein the mode value corresponds to a first mode value of six predefined mode values if:
the PIM type implemented by the received multicast data packet is PIM-SM, PIM-DM, or PIM-SSM; and
the (DA, SA) key of the first lookup table entry corresponds to a (G, S) pair.

10. The method of claim 9 wherein the first mode value indicates that the network processor should validate the received packet via the RPF a Reverse Path Forwarding (RPF) check.

11. The method of claim 9 wherein the first mode value indicates that the network processor should forward the received multicast data packet to an egress port of the network device regardless of whether an RPF check passes or fails.

12. The method of claim 1 wherein the mode value corresponds to a second mode value of six predefined mode values if:
the PIM type implemented by the received multicast data packet is PIM-DM; and
the (DA, SA) key of the first lookup table entry corresponds to a (G, *) pair.

13. The method of claim 12 wherein the second mode value indicates that the network processor should forward the received multicast data packet to an egress port of the network device without validating the received packet via an RPF check.

14. The method of claim 12 wherein the second mode value indicates that the network processor should determine whether a lookup into a second lookup table resulted in a hit or miss, and if the lookup into the second lookup table resulted in a miss, the network processor should send a copy of the received multicast data packet to a management processor of the network device for processing.

15. The method of claim 1 wherein the mode value corresponds to a third mode value of six predefined mode values if:
the PIM type implemented by the received multicast data packet is PIM-DM; and
the (DA, SA) key of the first lookup table entry corresponds to a (G/m, *) pair.

16. The method of claim 15 wherein the third mode value indicates that the network processor should drop the received multicast data packet without validating the received packet via an RPF check.

17. The method of claim 1 wherein the mode value corresponds to a fourth mode value of six predefined mode values if:
the PIM type implemented by the received multicast data packet is PIM-SM or PIM-SSM; and
the (DA, SA) key of the first lookup table entry corresponds to a (G, *) pair.

18. The method of claim 17 wherein the fourth mode value indicates that the network processor should validate the received multicast data packet via an RPF check.

19. The method of claim 17 wherein the fourth mode value indicates that the network processor should forward the received multicast data packet to an egress port of the network device regardless of whether an RPF check passes or fails.

20. The method of claim 17 wherein the fourth mode value indicates that the network processor should:
determine whether a lookup into a second lookup table resulted in a hit or miss;
if the lookup into the second lookup table resulted in a hit, determine whether an RPF check resulted in a pass or fail; and
and if the RPF check resulted in a pass, send a copy of the received multicast data packet to a management processor for processing.

21. The method of claim 1 wherein the mode value corresponds to a fifth mode value of six predefined mode values if:
the PIM type implemented by the received multicast data packet is PIM-SM or PIM-SSM; and
the (DA, SA) key of the first lookup table entry corresponds to a (G/m, *) pair.

22. The method of claim 21 wherein the fifth mode value indicates that the network processor should determine whether a lookup into a second lookup table resulted in a hit or miss, and if the lookup into the second lookup table resulted in a hit, send a copy of the received multicast data packet to a management processor for processing.

23. The method of claim 1 wherein the fifth mode value indicates that the network processor should drop the received multicast data packet without validating the received packet via an RPF check.

24. The method of claim 1 wherein the mode value corresponds to a sixth mode value of six predefined mode values if:
the PIM type implemented by the received multicast data packet is PIM-BIDIR; and
the (DA, SA) key of the first lookup table entry corresponds to a (G, *) pair or a (G/m, *) pair.

25. The method of claim 24 wherein the sixth mode value indicates that the network processor should validate the received multicast data packet via an RPF check.

26. The method of claim 24 wherein the sixth mode value indicates that the network processor should forward the received multicast data packet to an egress port of the network device if an RPF check passes, and drop the received multicast data packet if the RPF check fails.

27. The method of claim 1 wherein the mode value is a user-defined value that identifies a custom operational flow for forwarding the received multicast data packet.

28. The method of claim 27 further comprising:
retrieving, based on the pointer included in the first lookup table entry, a bitmask from the results table, the bitmask including parameter values that define the custom operational flow.

29. The method of claim 28 wherein the parameter values include a parameter value that indicates whether the network processor should validate the received multicast data packet via an RPF check.

30. The method of claim 28 wherein the parameter values include a parameter value that indicates whether the network processor should forward the received multicast data packet to an egress port of the network device.

31. The method of claim 28 wherein the parameter values include a parameter value that indicates whether the network processor should generate an exception if an RPF check fails.

32. The method of claim 28 wherein the parameter values include a parameter value that indicates whether the network processor should evaluate the outcome of a lookup into a second lookup table.

33. The method of claim 28 wherein the parameter values include a parameter value that indicates whether the network processor should mark a header of the received multicast data packet if an RPF check fails.

34. The method of claim 28 wherein the parameter values include a parameter value that indicates whether the network processor should send a copy of the received multicast data packet to a management processor of the network device if a lookup into a second lookup table results in a miss.

35. A network device comprising:
a plurality of ports; and
a network processor configurable to:
perform a lookup into a first lookup table based on one or more sections of a received multicast data packet, the received multicast data packet implementing one of a plurality of Protocol Independent Multicast (PIM) types that include PIM Sparse Mode (PIM-SM), PIM Dense Mode (PIM-DM), Bidirectional PIM (PIM-BIDIR), and PIM Source-Specific Multicast (PIM-SSM);
determine, based on the lookup into the first lookup table, a first lookup table entry matching the one or more sections of the received multicast data packet; and
retrieve, based on a pointer included in the first lookup table entry, a mode value from a results table, wherein the mode value identifies an operational flow to be carried out by the network processor for forwarding the received multicast data packet, and wherein the mode value differs based upon the PIM type implemented by the received multicast data packet and a (destination address (DA), source address (SA)) key of the first lookup table entry, the DA corresponding to one or more multicast group addresses associated with the PIM type.

36. The network device of claim 35 wherein the mode value is a user-defined value that identifies a custom operational flow for forwarding the received multicast data packet.

37. The network device of claim 36 wherein the network processor is further configurable to:
retrieve, based on the pointer included in the first lookup table entry, a bitmask from the results table, the bitmask including parameter values that define the custom operational flow.

38. The network device of claim 35 wherein the network processor is implemented as an Application-Specific Integrated Circuit (ASIC).

39. The network device of claim 35 wherein the network device is a switch or router.

40. A non-transitory computer readable storage medium having stored thereon program code executable by a processor, the program code comprising:
code that causes the processor to perform a lookup into a first lookup table based on one or more sections of a received multicast data packet, the received multicast data packet implementing one of a plurality of Protocol Independent Multicast (PIM) types that include PIM Sparse Mode (PIM-SM), PIM Dense Mode (PIM-DM), Bidirectional PIM (PIM-BIDIR), and PIM Source-Specific Multicast (PIM-SSM);
code that causes the processor to determine, based on the lookup into the first lookup table, a first lookup table entry matching the one or more sections of the received multicast data packet; and
code that causes the processor to retrieve, based on a pointer included in the first lookup table entry, a mode value from a results table, wherein the mode value identifies an operational flow to be carried out by the network processor for forwarding the received packet, and wherein the mode value differs based upon the PIM type implemented by the received multicast data packet and a (destination address (DA), source address (SA)) key of the first lookup table entry, the DA corresponding to one or more multicast group addresses associated with the PIM type.

41. A method comprising:
performing, by a network processor of a network device, a lookup into a first lookup table based on one or more sections of a received packet;
determining, by the network processor based on the lookup into the first lookup table, a first lookup table entry;
retrieving, by the network processor based on a pointer included in the first lookup table entry, a mode value from a results table, the mode value identifying an operational flow to be carried out by the network processor; and
forwarding, by the network processor, the received multicast packet in accordance with the operational flow identified by the mode value,
wherein the received packet is a multicast packet that implements one of a plurality of Protocol Independent Multicast (PIM) types, the plurality of PIM types including PIM Sparse Mode (PIM-SM), PIM Dense Mode (PIM-DM), Bidirectional PIM (PIM-BIDIR), and PIM Source-Specific Multicast (PIM-SSM), and
wherein the mode value corresponds to a first mode value in a plurality of mode values if:
the PIM type implemented by the received packet is PIM-SM, PIM-DM, or PIM-SSM; and
a (destination address, source address) key of the first lookup table entry corresponds to a (multicast group address, source address) pair.

42. A network device comprising:

a plurality of ports; and a network processor configurable to:

perform a lookup into a first lookup table based on one or more sections of a received packet;

determine, based on the lookup into the first lookup table, a first lookup table entry; and retrieve, based on a pointer included in the first lookup table entry, a mode value from a results table, the mode value identifying an operational flow to be carried out by the network processor for forwarding the received packet, wherein the received packet is a multicast packet that implements one of a plurality of Protocol Independent Multicast (PIM) types, the plurality of PIM types including PIM Sparse Mode (PIM-SM), PIM Dense Mode (PIM-DM), Bidirectional PIM (PIM-BIDIR), and PIM Source-Specific Multicast (PIM-SSM), and wherein the mode value corresponds to a first mode value in a plurality of mode values if:

the PIM type implemented by the received packet is PIM-SM, PIM-DM, or PIM-SSM; and a (destination address, source address) key of the first lookup table entry corresponds to a (multicast group address, source address) pair.

43. A non-transitory computer readable storage medium having stored thereon program code executable by a processor, the program code comprising:

code that causes the processor to perform a lookup into a first lookup table based on one or more sections of a received packet;

code that causes the processor to determine, based on the lookup into the first lookup table, a first lookup table entry; and code that causes the processor to retrieve, based on a pointer included in the first lookup table entry, a mode value from a results table, the mode value identifying an operational flow to be carried out by the network processor for forwarding the received packet, wherein the received packet is a multicast packet that implements one of a plurality of Protocol Independent Multicast (PIM) types, the plurality of PIM types including PIM Sparse Mode (PIM-SM), PIM Dense Mode (PIM-DM), Bidirectional PIM (PIM-BIDIR), and PIM Source-Specific Multicast (PIM-SSM), and wherein the mode value corresponds to a first mode value in a plurality of mode values if:

the PIM type implemented by the received packet is PIM-SM, PIM-DM, or PIM-SSM; and a (destination address, source address) key of the first lookup table entry corresponds to a (multicast group address, source address) pair.

* * * * *